United States Patent Office 3,011,899
Patented Dec. 5, 1961

3,011,899
SHEEP MARKING COMPOSITION
Leo Morgan Bergman, Portland, Oreg., assignor to Stanley Drug Products, Inc., Portland, Oreg., a corporation of Oregon
No Drawing. Filed June 13, 1958, Ser. No. 741,736
12 Claims. (Cl. 106—19)

This invention relates to a novel composition which is especially suited for marking the wool of sheep for purposes of identification, and also, it relates to a method by which such marking can be accomplished.

Various materials are being used today for marking the wool of sheep but none of them is entirely satisfactory. One type of material is highly resistant to rain and will not rub off when the animal rubs his wool against a tree, boulder or the like, but it cannot be removed satisfactorily in the scouring bath. On the other hand, if a type of material is used that is readily removed in the scouring, it has very little resistance to rain water or abrasive action. In other words, prior workers would prepare the marking material to enhance one property to a point at which another property is lessened undesirably, so that the disadvantage prevents acceptance as an all-purpose marking medium. In the present invention the working material overcomes substantially the disadvantages in conventional marking compositions.

An object of this invention is to provide a marking composition for sheep which can withstand abrasive action in use and be resistant to the washing action of rain water.

Another object is to provide a method of marking sheep whereby the mark will be retained for as long as is customary between shearing times and yet it can be removed by washing the wool with hot water.

Other objects and advantages of this invention will become apparent from the following description and explanation thereof. In accordance with this invention the marking composition comprises a wax material having a melting point not above about 135° F., a pigment, and an emulsifier which is a partial ester of polyhydric alcohol and a fatty acid containing 12 to 22 carbon atoms, the emulsifier being a glycol or glycerol derivative in which at least one hydroxyl group is not esterified.

The composition is characterized by being pliable in consistency so that it can withstand the abrasive action which is caused by a sheep rubbing his wool against a tree or boulder. It can be emulsified by the application of hot water, and detergent or soap, but it will remain substantially unaffected by cold water such as rain water or the like. These properties distinguish the present invention from any previous marking material, because, as mentioned hereinabove, previous materials would possess one but not all of the desirable properties of the present composition. The pliable property can be defined in terms of melting point. The melting point of the material is about 100 to 110° F.

The wax material can be a single compound or a mixture of them. It may range in solid consistency from that of petrolatum to a fairly hard wax, but the melting point does not usually exceed about 135° F. When the melting point of the wax material is increased beyond the value mentioned, the marking material to which it is added tends to become brittle. Specific examples of wax materials are spermaceti, myrtle wax, petrolatum, etc. The examples designate that for the purpose of this specification and the appended claims, a wax material includes petrolatum. The wax material constitutes about 45 to 55% by weight of the final solid composition.

The emulsifier is a partial ester of a polyhydric alcohol and a fatty acid. The polyhydric alcohol may be a glycol or glycerol, and it is partially esterified with a fatty acid containing 12 to 22 carbon atoms. The polyalkylene glycols are particularly suited for this purpose, especially those having from about 4 to 400 carbon atoms in the molecule. Specific examples of such glycols are diethylene glycol, triethylene glycol, tetraethylene glycol, etc. The glycol or glycerol is esterified with a fatty acid which can be saturated or unsaturated such as, for example, lauric acid, myristic acid, palmitic acid, stearic acid, arachidic acid, etc. The alcohol and acid are preferably reacted so that only one acid radical is present in the emulsifier molecule. The long fatty acid radical serves to make the molecule oleophilic, whereas the hydroxyl groups make the molecule hydrophilic. Specific examples of emulsifiers are diethylene glycol monostearate, triethylene glycol monopalmitate, tetraethylene glycol myristate, etc.

The choice of emulsifier to be used with the wax material is determined by the ultimate consistency which is sought. When a relatively hard wax is employed, the emulsifier is relatively soft to provide the requisite pliable consistency. In some cases, the emulsifier to be used may impart good emulsification characteristic to the marking material, but the consistency is not as good as desired. This can be adjusted by the addition of a secondary emulsifier which has the desired softness and does not impart the emulsification characteristic of the marking material. The emulsification property of the marking material is such that hot water at a temperature of about 135 to 145° F. would, when in contact with the marking material for 2 to 5 minutes, effect substantially complete emulsification. Generally, the primary emulsifier comprises about 22 to 30% by weight of the final composition.

The pigment which is present in the marking material can be any one or more of those well known in the art for this purpose, whether they are natural occurring or synthetically prepared. The pigment may be organic or inorganic in nature and include, for example, the insoluble azo group, the chromate group, the ferrocyanide group, etc. The color of the pigment may be red, blue, black, etc. Generally, the pigment may constitute about 3 to 6% by weight of the total solids marking composition.

The above marking composition is present on the wool of the sheep after the carrier or solvent has been evaporated completely. The solvent facilitates application of the marking composition to the sheep's wool. The solvent or carrier is organic in nature and dispenses or dissolves the wax material. It is desirable that the solvent be cheap in price and volatilize readily at ambient temperature levels. Suitable classes of materials for this purpose are the low boiling aliphatic hydrocarbons, singly or in mixtures, which boil below about 400° F., e.g. hexane, octane, naphtha, gasoline, etc.; the low molecular weight ketones, i.e. those having about 3 to 6 carbon atoms, e.g. acetone, methyl ethyl ketone, methyl isobutyl ketone, etc.; carbon tetrachloride; low molecular weight alkyl esters of fatty acids containing about 4 to 6 carbon atoms, e.g. ethyl acetate, butyl acetate, etc.; benzene and its low molecular weight homologues which contain from 1 to 3 methyl groups, e.g. benzene, toluene, zylene, etc.; halocarbons containing not more than 2 carbon atoms and substituted with chlorine and/or fluorine, e.g. trichlorofluoromethane, trichlorotrifluoro ethane, etc.; alkanols containing about 1 to 4 carbon atoms, e.g. methanol, ethanol, isopropanol or butanol; etc. The solvent constitutes about 35 to 45% by weight of the final composition, depending on the desired consistency.

As an optional feature of the present invention, an organic thickener or bodying agent may be added to the marking material which is dissolved and/or dispersed in the carrier or solvent. The thickener imparts to the composition an optimum thickness or flowability for application to the sheep's wool. However, the composition can be applied without the thickening agent. The bodying agent can be any one or more of those which are used in the industry for paints or lacquers. The lacquer bodying agents include, for example, Glyptal resin, e.g. phthalic anhydride-glycerol, etc.; Bakelite, e.g. phenol-formaldehyde; urea-formaldehyde resin; melamine-formaldehyde resin; polyvinyl acetate; etc. The bodying agent is added to the solution or dispersion in an amount of about 1 to 2% by weight of solids, or until the mass has a viscosity of about 60 to 70 Krebs units at 25° C.

To provide a fuller understanding of the present invention, the following examples are given.

Example I

| Ingredient: | Weight |
|---|---|
| Paraffin wax, M.P.=130° F. lbs | 2 |
| Polyethylene glycol monostearate lb | 1 |
| Diethylene glycol monostearate lb | 1 |
| Hexane, q.s. 140 oz. fluid. | |
| Pigment oz | 2-4 |

The above composition was used in marking the wool of a herd of sheep. The composition had good consistency for application, and the hexane solvent evaporated completely soon after application. The residual marking stood up very well to the time that the sheep were sheared, notwithstanding the abuse encountered while the sheep grazed. The sheared wool was washed in hot water with detergent or soap, and in every case, the mark was removed completely from the wool.

Other examples of marking compositions are as follows:

Example II

| Ingredient: | Weight |
|---|---|
| Petrolatum lb | 1 |
| Paraffin wax (M.P.=130° F.) lb | 1 |
| Polyethylene glycol monostearate lb | ¾ |
| Diethylene glycol monostearate lb | 1¼ |
| Hexane, q.s. 140 fl. oz. | |
| Pigment oz | 2-4 |

Example III

| Ingredient: | Weight |
|---|---|
| Spermaceti lbs | 2 |
| Polyethylene glycol monostearate lb | 1 |
| Diethylene glycol monostearate lb | 1 |
| Hexane, q.s. 140 fl. oz. | |
| Pigment oz | 2-4 |

Example IV

| Ingredient: | Weight |
|---|---|
| Paraffin wax (M.P.=130° F.) lb | 1 |
| Beeswax lb | 1 |
| Polyethylene glycol monostearate lb | 1 |
| Diethylene glycol monostearate lb | 1 |
| Hexane, q.s. 140 fl. oz. | |
| Pigment oz | 2-4 |

Another suitable composition can be prepared from paraffin wax, stearic acid and (8%) triethanolamine. The paraffin wax is rendered emulsifiable or dispersible in hot water by means of the triethanolamine.

Having thus provided a written description of the present invention along with specific examples thereof, the present invention is defined by the appended claims.

I claim:
1. A composition consisting essentially of a wax material having a melting point not above 135° F., 22 to 30% of a partial ester of a polyhydric alcohol selected from the group consisting of a glycol and a glycerol and of a fatty acid containing about 12 to 22 carbon atoms, an organic solvent, and a pigment, said partial ester rendering said composition resistant to removal by abrasive action from growing wool, incapable of removal from wool with cold water, and removable from wool with hot water by emulsification.

2. The composition of claim 1 wherein said wax is spermaceti.

3. The composition of claim 1 wherein said wax is myrtle wax.

4. The composition of claim 1 wherein said wax is petrolatum.

5. The composition of claim 1 wherein said wax is paraffin wax.

6. The composition of claim 5 wherein said alcohol is polyethylene glycol.

7. The composition of claim 6 wherein said ester is polyethylene glycol monostearate and diethylene glycol monostearate.

8. The composition of claim 7 wherein there are by weight about 2 parts paraffin wax, 1 part polyethylene glycol monostearate, 1 part diethylene glycol monostearate, and 3-6% of pigment.

9. The composition of claim 1 wherein said solvent is selected from the group consisting of a low boiling aliphatic hydrocarbon, a low molecular weight ketone, a low molecular weight alkyl ester of fatty acid, benzene, a homologue of benzene containing from 1 to 3 methyl groups, a halocarbon containing not more than 2 carbon atoms, and an alkanol containing 1 to 4 carbon atoms.

10. A composition consisting essentially of a wax material having a melting point not above 135° F., a partial ester of a polyhydric alcohol selected from the group consisting of a glycol and a glycerol and of a fatty acid containing about 12 to 22 carbon atoms, the amount by weight of said wax material and said partial ester being approximately the same, and a pigment, said partial ester rendering said composition resistant to removal by abrasive action from growing wool, incapable of removal from wool with cold water, and removable from wool with hot water by emulsification.

11. A method of marking the wool of sheep which comprises applying to the same the composition of claim 1.

12. A method of marking the wool of sheep which comprises applying the composition of claim 7 to the same.

References Cited in the file of this patent

UNITED STATES PATENTS

| 2,380,166 | Griffin | July 10, 1945 |
| 2,435,222 | Kline | Feb. 3, 1948 |
| 2,487,557 | Jourgensen | Nov. 8, 1949 |
| 2,563,499 | Smith | Aug. 7, 1951 |
| 2,684,948 | Cross | July 27, 1954 |
| 2,735,780 | LeCompte et al. | Feb. 21, 1956 |

OTHER REFERENCES

Atlas publication—"Surface Active Agents"—pub. by Atlas Powder Co., Wilmington, Del. (pp. 37 and 38).

Schwartz-Perry: "Surface Active Agents," pub. 1949 by Interscience Publishers (pages 214 and 234).